Patented June 11, 1940

2,203,749

UNITED STATES PATENT OFFICE 2,203,749

STABILIZING ORGANIC ESTERS OF CELLULOSE OF HIGH ACYL VALUE

George W. Seymour and Blanche B. White, Cumberland, Md., assignors to Celanese Corporation of America, a corporation of Delaware No Drawing. Application February 28, 1939, Serial No. 258,951

9 Claims. (Cl. 260—230)

This invention relates to the production of organic esters of cellulose and relates more particularly to the production of stabilized organic esters of cellulose of high acyl value and in a fibrous form so that they may readily be dissolved in the solvents therefor.

An object of this invention is the production of stable organic esters of cellulose having an acyl value of above 55%, calculated as acetic acid. Another object of the invention is the production of a fibrous precipitate of an organic ester of cellulose of high acyl value directly from the acid solution in which it is formed. Other objects of this invention will appear from the following detailed description.

This invention is applicable to the production of organic esters of cellulose such as cellulose formate, cellulose acetate, cellulose propionate and cellulose butyrate. For simplifying the description of the invention, however, particular reference will be made to the production of cellulose acetate which is the most commercially important at the present time.

Esters of cellulose having substantially a triester degree of esterification have been produced but heretofore these esters have not been stable and more impossible of stabilization until sufficient hydrolysis had occurred to lower the acyl value to below 55%, calculated as acetic acid. One reason for this is that there was no known method for precipitating the cellulose ester from the solution in which it was formed in such a condition that it could be stabilized. Attempts made heretofore to precipitate the same resulted in a glassy product which, although ground to very minute size, was not capable of being freed of catalyst and other compounds which effected the hydrolysis of the ester. We have found that cellulose acetate having high acetone solubility may be produced by the use of large proportions of sulphuric acid as a catalyst. However, to produce such an acetone soluble cellulose acetate employing the relatively large amount of sulphuric acid only added to the difficulty of forming a stable product.

Esters of cellulose having a high acyl value after being stabilized have many desirable properties. They do not deluster readily and retain this property over a substantial period of time so that yarns of two different ages may be woven together without producing a fabric having defects therein due to differential delustering developed during scouring and dyeing treatments. Esters of cellulose of high acyl value show a lower moisture regain and films made from the same have a greater resistance to blush, distortion and cockling. Fabrics prepared from high acyl cellulose esters can be processed at higher temperatures in dyeing, thereby increasing the dyeing and levelling rates without the attendant tendency to deluster or give a rubbery hand.

For the purpose of producing esters of cellulose of high acyl value having a high solubility in acetone there may be employed large quantities of catalyst. For instance, to produce cellulose acetate having a high acetone stability and an acetyl value of above 55%, calculated as acetic acid, there is employed from 110% to 200% of the normal amount of sulphuric acid used as catalyst.

In accordance with this invention, we produce stable fibrous organic esters of cellulose having a high acetone solubility and having an acyl value of above 55%, calculated as acetic acid. This we accomplish by using as the esterification catalyst sulphuric acid in an amount from about 16%, based on the weight of cellulose, to about 30%, and preferably 21.7%, diluting the acetylation mixture with twice its weight of methyl acetate or other solvent diluent, adding a salt capable of forming a sulphate which is insoluble in acetic acid but reasonably soluble in aqueous acetic acid such as sodium acetate or sodium carbonate, and preferably bivalent alkaline earth carbonates or acetates, e. g. magnesium carbonate and magnesium acetate, and then precipitating the cellulose ester by the addition of water. This results in the production of an organic ester of cellulose in fibrous form substantially free of any combined $SO_4$ groups having a high acetone solubility and yet in a substantially undegraded, unhydrolyzed condition. When water alone is used for the precipitation in the presence of large amounts of sulphuric acid there is a breaking down in the size of the molecule, while when employing a solvent diluent and water for the precipitation in the presence of a large amount of sulphuric acid immediate precipitation of the primary cellulose acetate is impossible. However, when employing a solvent diluent method of precipitation wherein before precipitation the excess sulphuric acid is neutralized by the salts indicated above, preferably magnesium carbonate or acetate, a stabilized precipitate is obtained which is undegraded. The use of magnesium salts is preferred since magnesium sulphate is not soluble in acetic acid and therefore neutralizes the sulphuric acid. Magnesium sulphate is, however, sufficiently soluble in water to make it readily removable after precipitation has been accomplished. It is found that by using the above method of precipitation there is a great reduction in the total sulphate in the precipitate by reason of this treatment which is extremely interesting as this same method of precipitation applied to cellulose acetate produced when employing the normal amount of catalyst shows no consistent decrease in sulphates or improvement in stability.

In the production of cellulose acetate, for example, cotton linters, with or without a pretreatment with an inorganic or organic acid, are esterified by reacting them with acetic anhydride in the presence of sufficient glacial acetic acid to dissolve the resulting ester and more than 110%, based on the amount normally used, of concentrated sulphuric acid as a catalyst. Thus, in producing cellulose acetate in accordance with this invention there is employed at least about 16 parts of concentrated sulphuric acid to every 100 parts of cellulose employed.

Examples of bivalent salts that may be employed in place of or in conjunction with magnesium acetate or magnesium carbonate are magnesium chloride, zinc chloride, etc. Examples of basic metallic salts which may be used in place of sodium acetate or sodium carbonate or in conjunction therewith are sodium bicarbonate, sodium phosphate and the corresponding potassium salts or salts of other alkaline earth metals. The quantity of these salts employed should be sufficient to neutralize all the sulphuric acid and may be used in solutions of from 2 to 15% concentration. Where there is employed a considerable quantity of solvent acid it is preferable to beat in about a 10% solution of the metallic salt and then add further water to effect precipitation.

Any suitable solvent diluent may be employed in place of or in conjunction with the methyl acetate such as, for example, the other esters such as ethyl acetate which is exceptionally good for this purpose, also mixtures of esters in alcohols, esters in acetone and/or polyhydric alcohols in acetone which produce a decided change in the solubility of the cellulose acetate but not to the extent of the change produced by the esters of cyclic acids and ethers such as dioxane, ethylene formal, etc. The amount of solvent diluent employed may vary from 100 to 300 times the weight of cellulose acetate in the solution.

For the purpose of describing this invention, but without being limited thereto, the following example is given:

*Example*

Acetylation of 170 parts of cotton linters is accomplished by reacting the same with about 630 parts of acetic acid and about 358 parts of acetic anhydride and 35 parts of concentrated sulphuric acid, all parts being by weight. The acetylation is effected in one hour and 15 minutes with a peak temperature of 33° C. when the acetyl value is about 60. The cellulose acetate solution is then diluted with about 2,400 parts of methyl acetate and there is added a 10% magnesium carbonate solution. The heated cellulose acetate solution is allowed to stand for at least 15 minutes and then precipitated by the addition of water. The resulting cellulose acetate has an acetyl value of 57.3, a Staudinger viscosity of 0.645 and is readily soluble in acetone. This cellulose acetate as it is precipitated is produced in fibrous form and may be stabilized by boiling the same in water.

It is to be understood that the foregoing detailed description is merely given by way of illustration and that many variations may be made therein without departing from the spirit of our invention.

Having described our invention, what we desire to secure by Letters Patent is:

1. Process for the manufacture of high acyl value cellulose esters of lower fatty acids characterized by being fibrous in form and soluble in acetone, which comprises esterifying cellulosic material in a medium which dissolves the cellulose ester formed and which contains as catalyst a proportion of from 16 to 30% of sulphuric acid, based on the weight of the cellulose, adding methyl acetate to the resulting primary solution, neutralizing the excess sulphuric acid in said primary solution, and then precipitating the cellulose ester from the solution in fibrous form as an acetone-soluble product having an acyl value above 55%.

2. Process for the manufacture of cellulose acetate of high acetyl value characterized by being fibrous in form and soluble in acetone, which comprises acetylating cellulosic material in a medium which dissolves the cellulose acetate formed and which contains as catalyst a proportion of from 16 to 30% of sulphuric acid, based on the weight of the cellulose, adding methyl acetate to the resulting primary solution, neutralizing the excess sulphuric acid in said primary solution, and then precipitating the cellulose acetate from the solution in fibrous form as an acetone-soluble product having an acetyl value above 55%.

3. Process for the manufacture of cellulose acetate of high acetyl value characterized by being fibrous in form and soluble in acetone, which comprises acetylating cellulosic material in a medium which dissolves the cellulose acetate formed and which contains as catalyst sulphuric acid in a proportion of the order of 21.7% based on the weight of the cellulose, adding methyl acetate to the resulting primary solution, neutralizing the excess sulphuric acid in said primary solution and then precipitating the cellulose acetate from the solution in fibrous form as an acetone-soluble product having an acetyl value above 55%.

4. Process for the manufacture of cellulose acetate of high acetyl value characterized by being fibrous in form and soluble in acetone, which comprises acetylating cellulosic material in a medium which dissolves the cellulose acetate formed and which contains as catalyst sulphuric acid in a proportion of the order of 21.7% based on the weight of the cellulose, adding methyl acetate to the resulting primary solution, neutralizing the excess sulphuric acid in said primary solution by adding to the primary solution a salt capable of forming a sulphate which is insoluble in said solution, and then precipitating the cellulose acetate from the solution in fibrous form as an acetone-soluble product having an acetyl value above 55%.

5. Process for the manufacture of cellulose acetate of high acetyl value characterized by being fibrous in form and soluble in acetone, which comprises acetylating cellulosic material in a medium which dissolves the cellulose acetate formed and which contains as catalyst sulphuric acid in a proportion of the order of 21.7% based on the weight of the cellulose, adding methyl acetate to the resulting primary solution, neutralizing the excess sulphuric acid in said primary solution by adding to the primary solution a bivalent metallic salt capable of forming a sulphate which is insoluble in said solution, and then precipitating the cellulose acetate from the solution in fibrous form as an acetone-soluble product having an acetyl value above 55%.

6. Process for the manufacture of cellulose acetate of high acetyl value characterized by being fibrous in form and soluble in acetone, which comprises acetylating cellulosic material in a medium which dissolves the cellulose acetate formed and which contains as catalyst sulphuric acid in a proportion of the order of 21.7% based on the weight of the cellulose, adding methyl acetate to the resulting primary solution, neutralizing the excess sulphuric acid in said primary solution by adding a magnesium salt to the primary solution, and then precipitating the cellulose acetate from the solution in fibrous form as an acetone-soluble product having an acetyl value above 55%.

7. Process for the manufacture of cellulose acetate of high acetyl value characterized by being fibrous in form and soluble in acetone, which comprises acetylating cellulosic material in a medium which dissolves the cellulose acetate formed and which contains as catalyst sulphuric acid in a proportion of the order of 21.7% based on the weight of the cellulose, adding methyl acetate to the resulting primary solution, neutralizing the excess sulphuric acid in said primary solution by adding magnesium acetate to the primary solution, and then precipitating the cellulose acetate from the solution in fibrous form as an acetone-soluble product having a acetyl value above 55%.

8. Process for the manufacture of cellulose acetate of high acetyl value characterized by being fibrous in form and soluble in acetone, which comprises acetylating cellulosic material in a medium which dissolves the cellulose acetate formed and which contains at least about 16 parts by weight of sulphuric acid for each 100 parts of cellulosic material employed in the acetylation, adding methyl acetate to the resulting primary solution, neutralizing the excess sulphuric acid in said primary solution by adding thereto a magnesium salt in a concentration of from 2 to 15%, permitting the so-treated solution to stand for about 15 minutes, and then precipitating the cellulose acetate from the solution by the addition of water, in fibrous form as an acetone-soluble product having an acetyl value above 55%.

9. Process for the manufacture of cellulose acetate of high acetyl value characterized by being fibrous in form and soluble in acetone, which comprises acetylating cellulosic material in a medium which dissolves the cellulose acetate formed and which contains at least about 16 parts by weight of sulphuric acid for each 100 parts of cellulosic material employed in the acetylation, adding methyl acetate to the resulting primary solution, neutralizing the excess sulphuric acid in said primary solution by adding thereto magnesium acetate in a concentration of from 2 to 15%, permitting the so-treated solution to stand for about 15 minutes, and then precipitating the cellulose acetate from the solution by the addition of water.

GEORGE W. SEYMOUR.
BLANCHE B. WHITE.